United States Patent [19]

Komoto et al.

[11] Patent Number: 4,749,460
[45] Date of Patent: Jun. 7, 1988

[54] PLATING CURRENT AUTOMATIC COMPENSATING APPARATUS

[75] Inventors: Haruo Komoto; Shigeharu Hamada; Yasuo Shiinoki, all of Hyogo; Katsumi Nagano, Fukuoka; Michio Sato; Hiroo Goshi, both of Aichi, all of Japan

[73] Assignees: Mitsubishi Denki Kabushiki Kaisha; Nippon Steel Corporation, both of Tokyo, Japan

[21] Appl. No.: 4,564

[22] Filed: Jan. 20, 1987

Related U.S. Application Data

[63] Continuation-in-part of Ser. No. 681,648, Dec. 14, 1984, abandoned.

[51] Int. Cl.⁴ .................... C25D 17/00; C25D 21/12
[52] U.S. Cl. .................................. 204/211; 204/228
[58] Field of Search ................ 204/14 R, 28, 211, 228

[56] References Cited

U.S. PATENT DOCUMENTS

2,734,858  2/1956  Bachman et al. ................ 204/28
3,365,382  1/1968  Godschalx ...................... 204/228
3,865,701  2/1975  Borgmann ...................... 204/28
3,887,452  6/1975  Mannaka et al. ................ 204/228
3,947,343  3/1976  Delves-Broughton et al. ... 204/28
4,240,881  12/1980  Stanya ........................... 204/228
4,497,695  2/1985  Shinkai et al. .................. 204/28

Primary Examiner—Donald R. Valentine
Attorney, Agent, or Firm—Bernard, Rothwell & Brown

[57] ABSTRACT

An apparatus in which plating currents of a plurality of successive plating cells are normally automatically controlled in accordance with line speed to maintain uniform plating thickness, and in which the number of energized plating cells is increased or decreased in accordance with line speed to maintain plating current density within a predetermined range, includes tracking or timing facilities for progressively changing plating currents of plating cells in correspondence with movement of the strip being plated through the cells after the number of energized cells has been increased or decreased so as to reduce plating thickness variation on the portion of the strip within the plating cells at the time of the change in the number of energized cells.

2 Claims, 7 Drawing Sheets

PLATING CURRENT AUTOMATIC COMPENSATING APPARATUS

Cross-Reference to Related Application

This application is a continuation-in-part of application Ser. No. 681,648, filed Dec. 14, 1984, now abandoned.

BACKGROUND OF THE INVENTION

1. Field of the Invention

The present invention relates to an apparatus for controlling the electroplating of a strip being passed sequentially through a plurality of plating cells.

2. Description of the Prior Art

Prior art apparatus for controlling electroplating of a continuous strip through a plurality of plating cells has included automatic control circuitry for controlling the total current applied to the plurality of cells as a function of a measured speed of the strip in order to maintain an even plating thickness on the strip when the line speed increases or decreases. A total current value or criterion is initially set based upon one or more factors such as the desired plating thickness, electrode efficiency and the width of the strip together with the minimum line speed of the strip through the plating cells.

Figure 1:
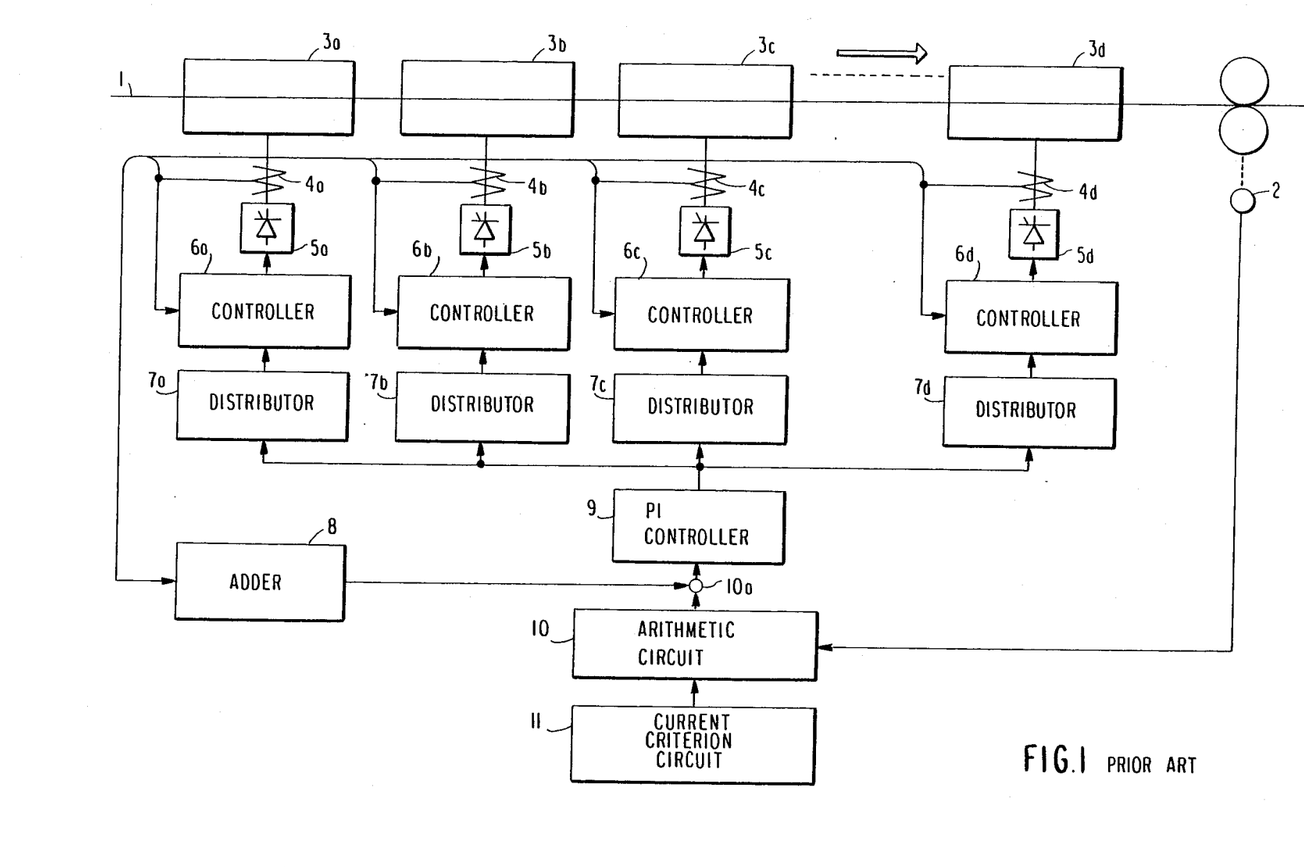
FIG. 1 is a block diagram showing a conventional plating current automatic compensating apparatus.

FIG. 1 is a block diagram of a conventional plating current control apparatus. A strip 1 is moved in the direction indicated by the arrow successively through plating cells 3a, 3b, 3c and 3d by a conventional drive mechanism (not shown) for electroplating a desired thickness on the strip. Sensors, such as current sensing shunts 4a, 4b, 4c and 4d detect the plating currents passing to the respective plating cells from respective rectifier circuits 5a, 5b, 5c and 5d, which are shown as being silicon controlled power rectifier circuits. Controllers 6a, 6b, 6c and 6d, controlled by feedback signals from the sensors 4a, 4b, 4c and 4d as well as by current demand signals from distributors 7a, 7b, 7c and 7d, operate the rectifier circuits 5a, 5b, 5c and 5d to generate the desired plating currents. An adder 8 sums the current magnitude signals from the detectors 4a, 4b, 4c and 4d and applies the sum to a proportional and integral (PI) controller 9 through an adder 10a. The output of PI controller 9 is connected to inputs of the distributors 7a, 7b, 7c and 7d. The adder 10a has a second input from arithmetic circuit 10 generating a desired total current signal which is the product of a set current signal from current criterion circuit 11 and a speed signal from tachometer 2 mechanically coupled to a wheel engaging the strip 1. The current criterion circuit calculates a total current criterion from a desired amount of plating on the strip 1, the length of the plating cells and the electrode efficiency at a minimum line speed.

In operation of the apparatus of FIG. 1, the arithmetic circuit 10 multiplies the signal from current criterion circuit 11 by the speed signal from tachometer 12 to thus generate a desired total current signal which varies in accordance with the speed of the strip 1 through the plating cells 3a-3d so as to maintain the production of a uniform plating thickness on the strip 1 during variations in the speed of the strip 1. The output of the adder 8, which is the sum of the plating currents sensed by detectors 4a, 4b, 4c and 4d has a sign opposite to that of the output of the arithmetic circuit 10 so that the output of adder 10a is the difference between the total measured current and the desired total current. The PI controller produces an output which is adjusted up or down in accordance with integration of the signal from adder 10a to produce a signal which is adjusted up or down only when the output of adder 8 differs from the output of arithmetic circuit 10. The output of PI controller 9 is distributed equally by distributor circuits 7a, 7b, 7c and 7d to the inputs of controllers 6a, 6b, 6c and 6d which in turn control the rectifier circuits 5a, 5b, 5c and 5d in a conventional manner to produce plating currents in the cells 3a, 3b, 3c and 3d to maintain a uniform plating thickness irrespective of the speed of the strip 1 through the plating cells.

Although the conventional plating control apparatus can maintain a total current through the plating cells which varies in accordance with line speed, there still exists deficiencies in the plating caused by line speed variations, such as a deficiency in the gloss of the plated surface, a variation in plating thickness resulting from a variation in electrode efficiency at different line speeds, and a deficiency in anti-corrosive characteristic of the plating. It is proposed that these deficiencies can be reduced by maintaining a plating current density within a predetermined range. The prior art plating control apparatus cannot maintain a plating current density in the predetermined range while simultaneously controlling the total plating current in accordance with variations in the line speed.

SUMMARY OF THE INVENTION

The present invention is summarized in a plating current automatic compensating apparatus wherein plating cells are energized and deenergized to maintain plating current density within a predetermined range together with sequential adjustment of the plating currents in the plating cells in accordance with the tracking of the strip through the cells. The tracking of the strip, initiated at the energization or deenergization of a plating cell, and a corresponding sequential adjustment in plating currents of the active cells avoids undesirable thickness variation on the section of the strip within the cells at the time of the energization or deenergization of the cell.

DESCRIPTION OF THE PREFERRED EMBODIMENTS

Figure 2:
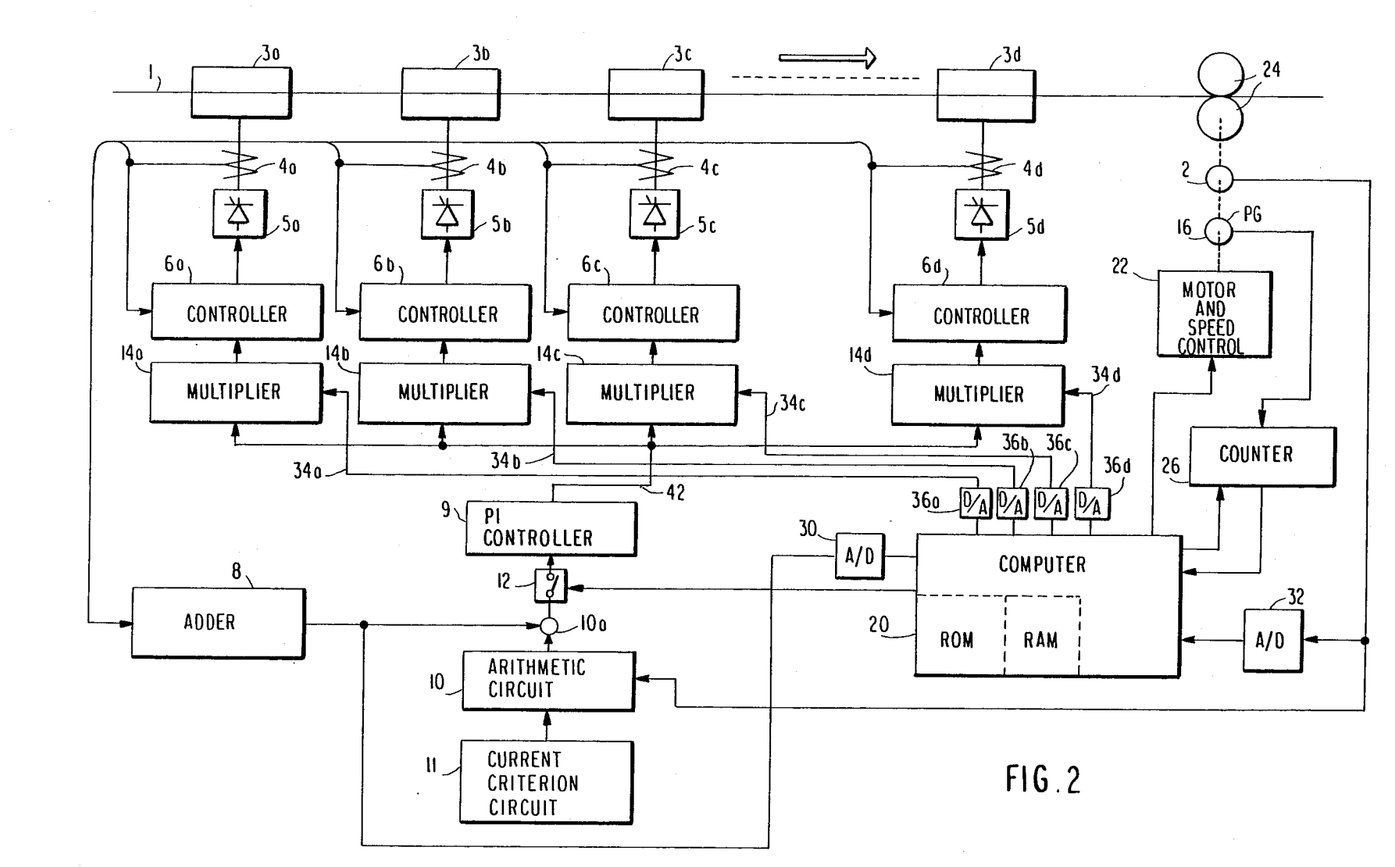
FIG. 2 is a block diagram showing a plating current compensating apparatus in accordance with the present invention.

One apparatus embodying the present invention, as shown in FIG. 2, includes a speed sensor 2, plating cells 3a, 3b, 3c and 3d, plating current sensors 4a, 4b, 4c and 4d, controlled rectifier circuits 5a, 5b, 5c and 5d, controllers 6a, 6b, 6c and 6d, adder 8, PI controller 9, adder 10a, arithmetic circuit 10, and current criterion circuit 11 which are substantially the same in structure and operation as similar elements described above in connection with the prior art apparatus shown in FIG. 1. The distributors 7a, 7b, 7c and 7d of the prior art FIG. 1 are replaced by respective multipliers 14a, 14b, 14c and 14d in FIG. 2.

The circuit of FIG. 2 additionally includes a computer 20 which operates a motor and speed control 22 driving rolls 24 to advance the strip 1 through the plating cells 3a, 3b, 3c and 3d. A pulse generator 16 driven at the same rate as the rolls 24 has an output connected to the input of a counter 26 which has its outputs connected to input ports of the computer 20. The computer 20 has an output connected to a reset input of the counter 26. Additional digital inputs to the computer 20 are provided by analog to digital converters 30 and 32 which receive analog signals indicating the magnitude of the total plating current to the cells 3a–3d and the line speed, respectively. One output of the computer 20 operates a switch 12 interposed between the adder 10a and the PI controller 9 for disconnecting the PI controller 9 from the adder 10a so that the output of PI controller can be locked and prevented from changing due to a signal from adder 10a.

Outputs 34a, 34b, 34c and 34d from respective digital to analog converters 36a, 36b, 36c and 36d operated by the computer 20 are connected to inputs of the multiplier circuits 14a, 14b, 14c and 14d which multiply the signal on line 42 from PI controller 9 by the signal on the corresponding line 34a, 34b, 34c and 34d. The multipliers 14a, 14b, 14c and 14d produce outputs which operate the respective controllers 6a, 6b, 6c and 6d. When the output of one or more multipliers is zero, the corresponding controller deenergizes its plating cell by discontinuing the production of pulses necessary to operate its silicon controlled rectifier circuit. For magnitudes of signals on the outputs of the multipliers greater than zero, the controllers produce pulses which have suitable phases relative to the AC power source for generating the corresponding magnitudes of currents in the plating cells.

Figure 3A:
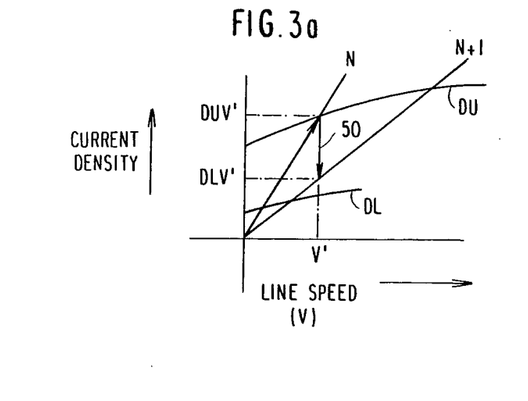
FIG. 3a is a graph showing current density versus line speed during the energization of an additional plating cell in the apparatus of FIG. 2.

In FIG. 3(a) line N represents the current density resulting from automatic total current control of N plating cells by PI controller 9 for varying line speed, and line N+1 represents the current density when N+1 plating cells are active or energized. Line DU represents the upper permissible current density limit and line DL represents the lower limit of the permissible current density range in order to produce an acceptable glossy plated finish with the desired corrosion resistance. With N plating cells active and with line speed increasing to V', the current density reaches the upper limit DUV'. As shown in FIG. 3(c) an additional cell, such as cell 3a (FIG. 2), is energized or rendered active. When the additional cell is rendered active, the output of adder circuit 8 increases which results in adder 10a producing a signal which if applied to PI controller 9 would change the signal on line 42 to decrease the current flow through each of the plating cells 3a–3d so as to reduce the output of adder circuit 8 to correspond to the output of arithmetic circuit 10. This would produce a reduction in plating current density as shown by line 50 in FIG. 3a so that the current density would remain within the range between lines DU and DL as the line speed increases above V'.

Figure 3B:
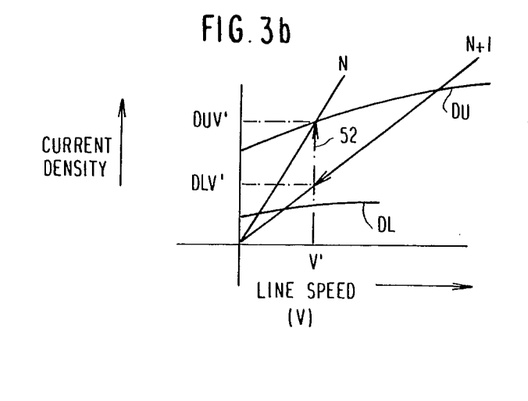
FIG. 3b is a graph similar to that of FIG. 3a, but illustrating deenergization of a plating cell.
Figure 3C:
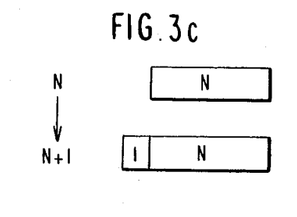
FIG. 3c is a diagram illustrating the energization of an additional plating cell in the apparatus of FIG. 2.
Figure 3D:
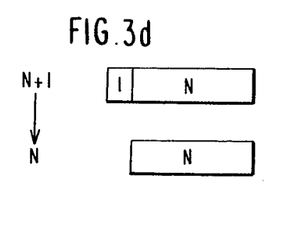
FIG. 3d is a diagram illustrating the deenergization of a plating cell in the apparatus of FIG. 2.

As shown in FIG. 3(b) for line speed decreasing while operating with N+1 cells active, the speed decreases to V' where the current density is DLV'. At this point it is recognized that one plating cell can be deenergized, such as illustrated in FIG. 3(d) to render only N cells active. With only N cells active, the output of adder circuit 8 decreases which results in adder 10a producing a signal which if applied to PI controller 9 would increase the output of PI controller 9 so as to increase the plating current flow through the now active plating cells until the total plating current reaches the desired value as indicated by the output of adder 8 equalling the output of the arithmetic circuit 10. Thus, the current density would increase from DLV' up to DUV' as indicated by line 52 in FIG. 3(b).

Figure 3E:
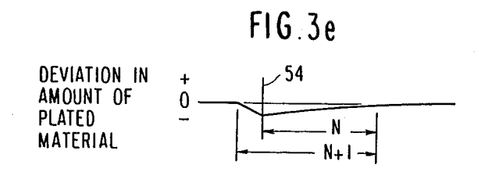
FIG. 3e is a graph of a decrease in plating thickness caused by the energization of an additional plating cell on a section of material within the plating cells during the energization.

When a plating cell is activated as shown in FIGS. 3(a) and 3(c), there can occur a reduction in the amount of plating which deposits on the section of strip 1 positioned within the plating cells 3a–3d at the time of the activation as shown in FIG. 3(e). The portion of the strip at line 54, which is entering the previous first active cell, but now second active cell, 3b, passes through the next N plating cells which have reduced currents producing a plating thickness upon this strip portion reduced by 1/(N+1) of the total desired thickness.

Figure 3F:
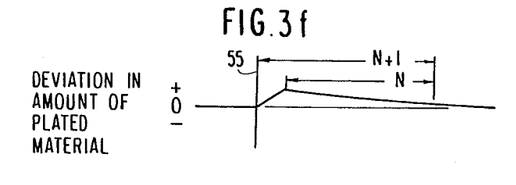
FIG. 3f is a graph of an increase in plating thickness caused by the deenergization of a plating cell on a section of material within the plating cells at the time of deenergization.

When a cell is deenergized as shown in FIGS. 3(b) and 3(d), the section of strip 1 within the plating cells at the time of deenergization has an increased amount of plating material applied thereto as illustrated in FIG. 3(f). The portion of the strip at point 55 which is exiting the first plating cell, for example, cell 3a, has already received a plating of 1/(N+1) at the time of the deenergization and now passes through the remaining activated N plating cells with increased current flow at the rate of 1/N so that additional plating material equal to 1/(N+1) of the total desired thickness is deposited thereon.

Figure 4:
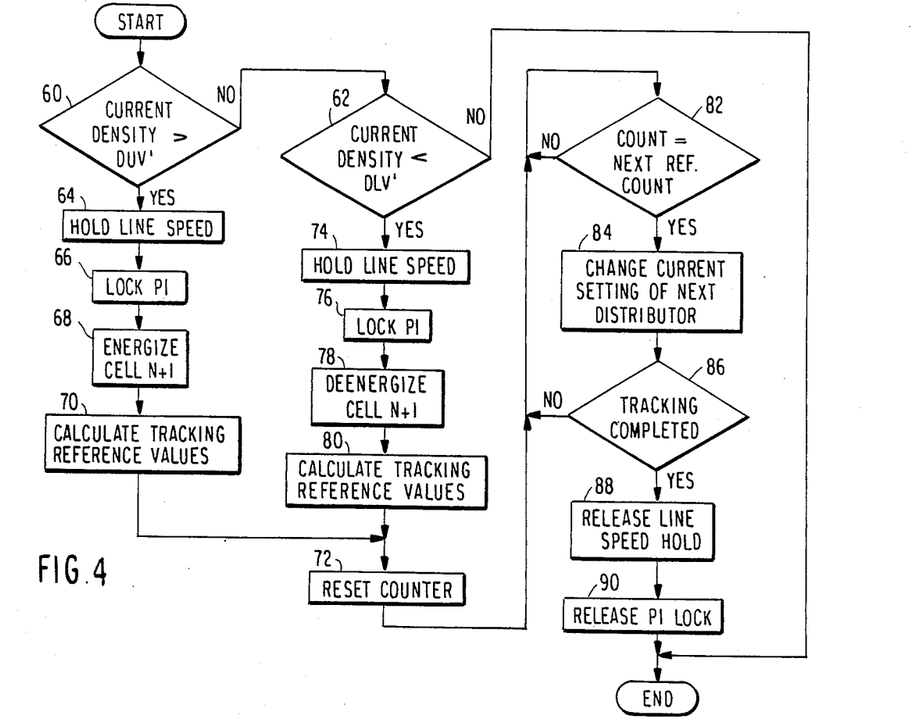
FIG. 4 is a step diagram of a procedure employed in a computer of the apparatus of FIG. 2.

The present invention substantially reduces the deviation in thickness of plated material, FIGS. 3(e) and 3(f), which can occur on the section of the strip 1 within the plating cells at the time of the increase or decrease in active cells by means of the program procedure of FIG. 4 for operating the computer 20 during the increase or decrease in active cells. The procedure of FIG. 4 is included in a continuously cycling main program, or called thereby, wherein the main program includes other conventional procedures such as operation of the motor and speed control 22, etc. In a first step 60, the total plating current of the cells from analog to digital converter 30 is read and the current density is computed from this reading and the known number of active plating cells. The current density is then compared with the value DUV' and if less than the maximum permissible value, proceeds to step 62 where this current density is compared with the minimum value DLV'. If the current density is greater than this minimum value DLV' then the program exits the procedure of FIG. 4 without making any change in the number of active plating cells.

If the current density is found greater than DUV' in step 60, the program proceeds to step 64 where any necessary steps are taken to prevent change in the line speed. From step 64 the program proceeds to step 66 where the computer 20 opens switch 12 to lock the output of the PI controller 9 at its level before energization of an additional plating cell. Then in step 68 the additional plating cell, such as cell 3a is energized. Energization is performed by changing the value on line 34a to the multiplier 14a from zero to a value calculated to generate a signal on the output of multiplier 14a corresponding to $1/(n+1)$ of the total current read from analog to digital converter 30 in step 60. Next in step 70 the computer calculates the number of cells and the counts of the counter 26 required for a selected imaginary point on the strip 1 to advance to the entrance of each of the succeeding cells 3b, 3c and 3d from the entrance of cell 3(a). Then the program proceeds to step 72 where the counter 26 is reset to 0.

If the current density is found less than the lower limit in step 62, the program proceeds through steps 74, 76, 78 and 80 wherein steps 74 and 76 are the same as steps 64 and 66. In step 78 however, a cell, such as cell 3a, is deenergized by applying the value zero on line 34a to the multiplier 14a which will generate a disabling or 0 output to the controller 6a. Thus, no plating current will pass through cell 3a. In step 80 count values and the number of plating cells are calculated. These count values differ from the count values selected in step 70 in that the count values correspond to counts required for the imaginary point, to advance to exits of the corresponding cells 3b, 3c and 3d from the entrance of cell 3a. Then the program proceeds to step 72 where the counter 26 is reset.

From step 72 the program oroceeds to step 82 where the count in the counter 26 is read and compared with the first count value calculated in step 70 or 80. Step 82 is repeated until the count value equals the reference count. Then the program proceeds to step 84 where the setting of the multiplier 14b will be adjusted by changing the signal value on line 34b. This value will have been calculated in step 70 or 80. A signal value calculated in step 70 generates a voltage on line 34b which causes a change in the output of multiplier 14b causing the controller 6b to decrease the plating current flow to cell 3b by $1/(N+1)$, whereas a signal value calculated in step 80 causes the signal on line 34b to generate a voltage to increase the output of multiplier 14b to cause controller 6b to increase the plating current to cell 3b by $1/(N+1)$. Additionally, in step 84, an index value will be incremented to point to the next multiplier, e.g., 14c. Then in step 86 the program returns to step 82 if tracking of the imaginary point has not been completed to all of the plating cells. Steps 82 and 84 are then repeated for cells 3c and 3d so that when the imaginary point on the line 1 reaches the entrance, in case of an increase in the number of plating cells, or reaches the exit in case of a decrease in the number of plating cells, the current of the corresponding cell is changed. When the imaginary tracking point passes the exit of the last cell, step 86 indicates that the tracking is completed and the computer proceeds to step 88 where the hold on any speed change is released. In step 90 the switch 12 is closed which permits the PI controller 9 to control the overall current through the active cells in a conventional manner.

Figure 5:
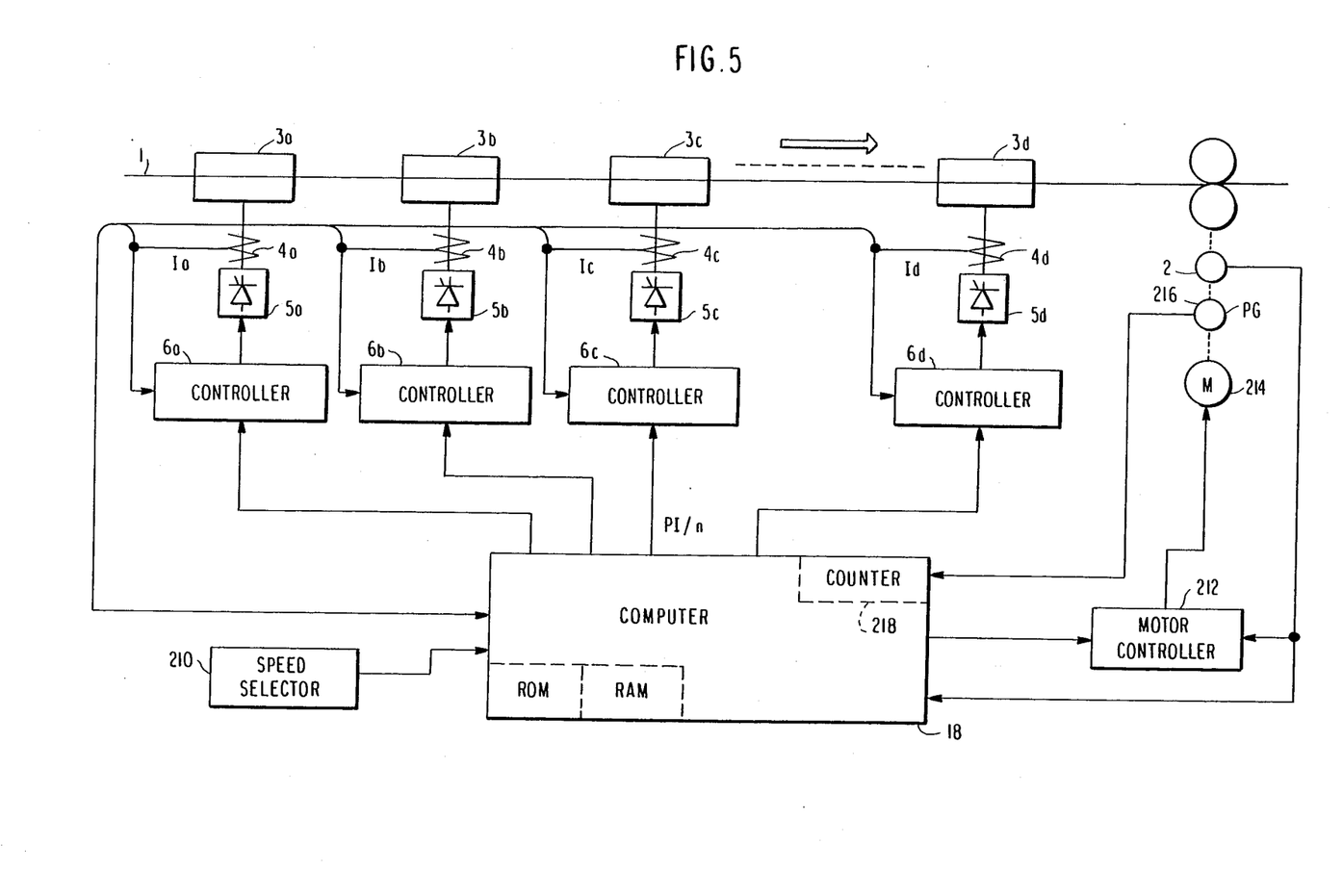
FIG. 5 is a block diagram of a modified plating current compensating apparatus in accordance with the invention.

The modified circuit of FIG. 5 includes a computer 18 which replaces the multiplier circuits 14a, 14b, 14c and 14d, the adder 8, the PI controller 9, the adder 10a, the arithmetic circuit 10, the current criterion circuit 11, the switch 12, and the computer 20 of FIG. 2. The computer 18 has analog inputs connected to each of the current sensors 4a, 4b, 4c and 4d and to the speed sensor 2, along with analog outputs connected to inputs of each of the respective controllers 6a, 6b, 6c and 6d. Additionally, the computer 18 includes a ROM containing a program procedure, illustrated in FIGS. 7, 8 and 9, which controls the computer 18 in a manner to provide the functions of the circuit of FIG. 2 as well as to provide for hysteresis in the changing of the number of active and inactive plating cells upon changes in line speed The computer 18 includes an input from a speed selector 210 which may be either an analog device such as a potentiometer or a digital switch device from which the computer can determine the desired line speed set by an operator. The computer 18 also includes an analog output to a motor controller 212 which receives feedback from the tachometer 2 in order to operate motor 214 driving the strip 1 in accordance with an analog signal from the computer 18. Additionally the computer 18 includes a counter 218 which is operated by pulses from a pulse generator 216 connected to the drive for the strip 1 to produce pulses having a frequency proportional to line speed.

Figure 6:
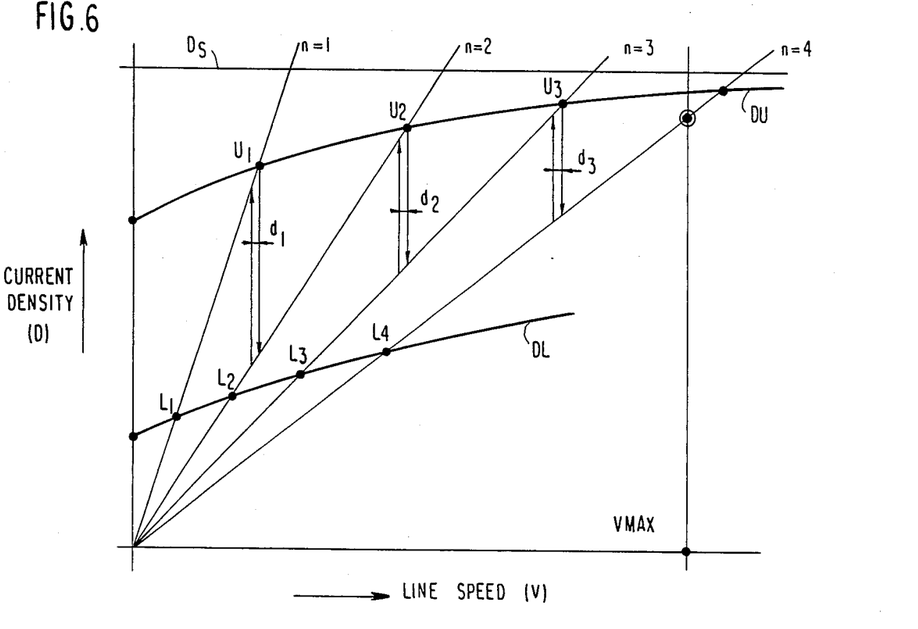
FIG. 6 is a graph showing current density vs. line speed with 1, 2, 3 and 4 cells energized in the apparatus of FIG. 5.
Figure 7:
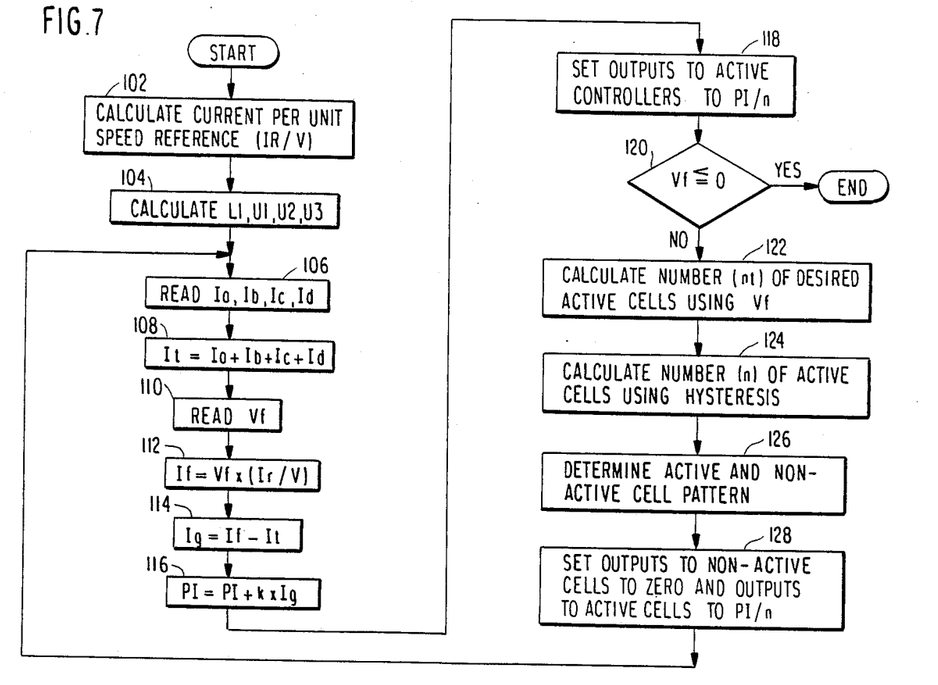
FIG. 7 is a step diagram of a procedure employed in the computer of the apparatus of FIG. 5.
Figure 8:
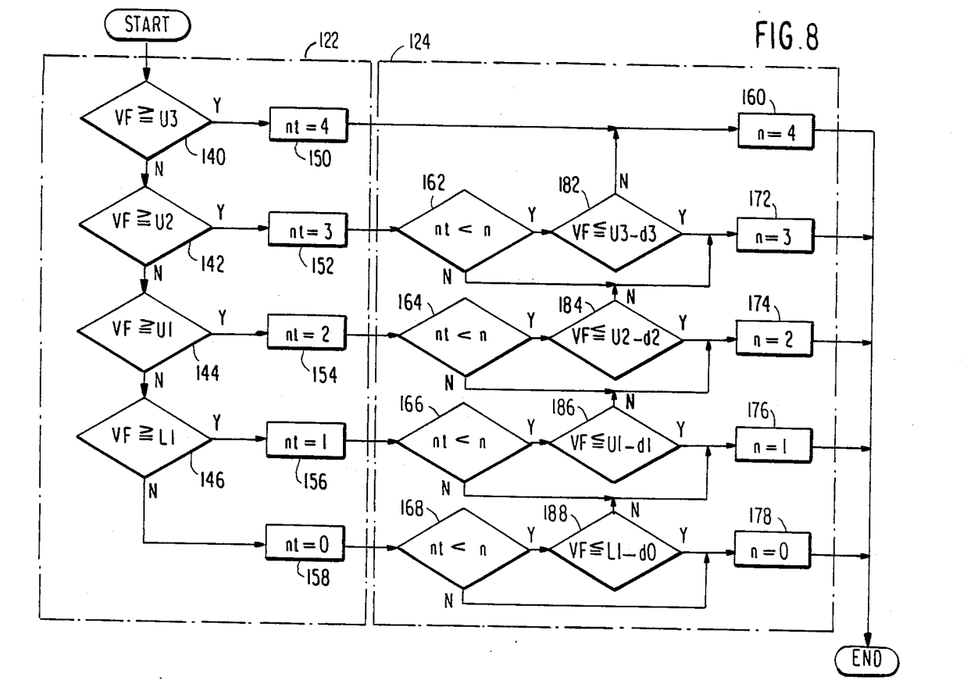
FIG. 8 is a detailed step diagram of two steps in the procedure of FIG. 7.

As shown in FIG. 7, the procedure begins with step 102 wherein a value for current per unit speed reference (IR/V) is calculated. This current per unit speed reference is the digital equivalent of the analog output produced by the current criterion circuit 11 of the prior art in FIG. 1, and is based upon the same factors such as the desired plating thickness, the length of the plating cells and electrodes, and the width of the strip to be plated. From step 102 the program proceeds to steo 104 where speed values L1, U1, U2 and U3 are calculated. These line speed values are shown in the graph of FIG. 6 wherein line DU represents the upper limit of the permissible current density range while line DL represents the lower limit of the permissible current density range. The values DU and DL are empirical values which have been previously determined and stored for the particular base material and plating solution. Line $n=1$ represents the current density required to produce the desired thickness plating relative to line speed when one plating cell is activated. Lines $n=2$, $n=3$ and $n=4$ represent similar current densities relative to speed for 2, 3 and 4, respectively, cells being activated. The values determining lines $n=1$, $n=2$, $n=3$ and $n=4$ are calculated based upon the desired plating thickness, plating efficiency for the particular plating solution and base material, and the length of the strip within each plating cell. From the values calculated for $n=1$, $n=2$, $n=3$ and $n=4$ and the previously determined values for DU and DL, the computer 18 then calculates L1, U1, U2 and U3. L1 represents the line speed at which current density will be at the lower limit DL for one cell being active and thus represents the minimum line speed at which plating can occur with current density in the range from DL to DU. U1 is the line speed at which current density is at the maximum DU for one cell being active. Similarly, U2 and U3 represent line speeds for the upper current density limit for two and three cells being active, respectively.

In the next step 106, the computer reads the current values Ia, Ib, Ic and Id from each of the current sensors 4a, 4b, 4c and 4d and then in step 108, the computer calculates the sum It of these current readings, Ia+Ib+Ic+Id, which is the total measured plating current. The output Vf of the line speed sensor 2 is read in step 110. The desired total current If is calculated in step 112 by multiplying the reading Vf obtained in step 110 by the calculated current per unit speed reference (IR/V) calculated in step 102. In step 114, the total measured plating current It, determined in step 108, is subtracted from the desired plating current If, calculated in step 112, to obtain a difference Ig. In step 116 a value PI is adjusted by multiolying Ig times a fractional constant K and adding the result to PI. The fractional value K is selected to avoid oscillations and unstable control of the plating current while permitting relatively rapid adjustment of the plating current to render It=If. In step 118 the analog outputs from computer 18 to active controllers of the controllers 6a, 6b, 6c and 6d are set in accordance with a proportional amount of the total value PI such as PI/n where n is the number of active controllers. In step 120 the procedure will stop if the speed reading from step 110 indicates that the line is stopped.

The steps 106, 108, 110, 112, 114, 116 and 118 control operation of the plating current line in accordance with one of the lines n=1, n=2, n=3 or n=4 in FIG. 6. For example if the plating current line contains four active plating cells, then the steps 106 through 118 will operate the plating cells to produce current density corresponding to n=4 for varying line speed. It is seen that the point L4 marks the minimum line speed which must be maintained in order for the current density to be above the lower limit DL of the desired range of plating current densities. During line starting and stopping periods, and sometimes during normal operation, a minimum speed L4 cannot be maintained thus resulting in inferior plating.

Steps 122, 124, 126 and 128 of FIG. 7 provide for the activation and deactivation of plating cells together with corresponding adjustment in the outputs to the controllers 6a, 6b, 6c and 6d in order to maintain current density within the range between the upper current density limit DU and the lower limit density DL. More particularly, in step 122 the line speed determined in step 110 is used to calculate the number nt of desired active cells. A procedure for performing the step 122 is illustrated in more detail in FIG. 8 and includes successive steps 140, 142, 144 and 146 where the measured speed value Vf is compared with U3, U2, U1 and L1, respectively. If the line speed is equal to or qreater than U3 in step 140, the program branches to step 150 where nt is set to 4; if the line speed is greater or equal to U2 in step 142, the program branches to step 152 where nt is set to 3; if line speed is greater or equal to U1 in step 144, the program branches to step 154 where nt is set to 2; if line speed is greater or equal to L1 in step 146, the program branches to step 156 where nt is set to 1; and if the line speed is less than L1 the program proceeds from step 146 to step 158 wherein nt is set to 0.

From step 122 in FIG. 7, the program proceeds to step 124 where the number n of active cells is calculated using hysteresis. The step 124 is also illustrated in more detail in FIG. 8. From steps 150, 152, 154, 156 and 158 of the procedure 122, the program proceeds to the respective steps 160, 162, 164, 166 and 168 of the procedure 124. In step 160 where the line speed is equal to or greater than U3, the number of active cells n will be set to 4. Steps 162, 164, 166 and 168 determine if the number of cells is to be decreased, and if found false indicating either an increase or a non-change in the number of active cells, the program proceeds to respective steps 172, 174, 176 and 178 where the active cell number n is set to 3, 2, 1 and 0, respectively. If steps 162, 164, 166 and 168 are found true, the program proceeds to respective steps 182, 184, 186 and 188 where it is determined if the measured line speed is less than or equal to U3−δ3, U2−δ2, U1−δ1, and L1−δ0, respectively. δ3, δ2, δ1 and δ0 are hysteresis values selected to avoid oscillation and unstable operation from normal variations in parameter readings and calculations causing oscillation or repeated switching between the number of active cells. If steps 182, 184, 186 and 188 are false the program proceeds to the respective steps 160, 172, 174 and 176 setting the values of n=4, 3, 2, and 1, respectively; and if steps 182, 184, 186 and 188 are found true, the program proceeds to the respective steps 172, 174, 176 and 178 where the number of active cells n is set to 3, 2, 1 and 0, respectively.

The selection of the number of active cells n using hysteresis is illustrated also in the graph of FIG. 6 where a decrease in the number of active cells from n=2, 3 or 4 to n=1, 2 or 3, respectively, occurs only when the line speed is reduced to U1−δ1, U2−δ2 and U3−δ3, respectively. For example, if one cell is active and the line speed increases from L1 to U1, the program will set nt=2 in step 154 and then proceed to step 164 and step 174 making n=2. The speed readings, and the calculations associated therewith vary and thus the next time that the computer passes through steps 122 and 124, the actual speed readings may be slightly less than U1 due to this normal variation. In this case the program will proceed from step 144 to 146 and 156 setting nt=1. Then in step 166 it is found that nt is less than n indicating that this is a decrease in the number of active cells causing the program to proceed to step 186. In step 186 the normal variation in speed readings and associated calculations will be less than the value 1 to indicate a false condition causing the program to branch to step 174 maintaining the value of n at 2 to avoid switching between n=1 and n=2 due to the normal variation in speed readings and associated calculations. The steps 182, 184 and 188 with their associated hysteresis factors 3, 2 and 0 provide for similar avoidance of switching between n=3 and 4, n=3 and 2 and n=1 and 0.

From step 124 in FIG. 7 the program proceeds to step 126 where the particular active and non-active cell pattern is determined. For example as shown in FIG. 3(c) the pattern of cell activation is opposite to the line feed direction; i.e., the line feed is from left to right while cells are activated beginning with the rightmost inactive cell and proceeding with the next left cell, or from right to left. Deactivation of cells as shown in FIG. 3(d) is in the same direction as the line feed; i.e., cells are deactivated beginning with the left most active cell and preceding to the next cell on the right. Many other cell activation and deactivation patterns are possible such as activating cells in the direction of line movement and deactivating cells in the direction opposite line movement, or activation and deactivation of cells may be according to predetermined patterns where intermediate cells are activated and/or deactivated prior to activation or deactivation of end cells. After determining the pattern of active and nonactive cells from stored patterns or programmed procedures, the program proceeds to step 128.

Figure 9:
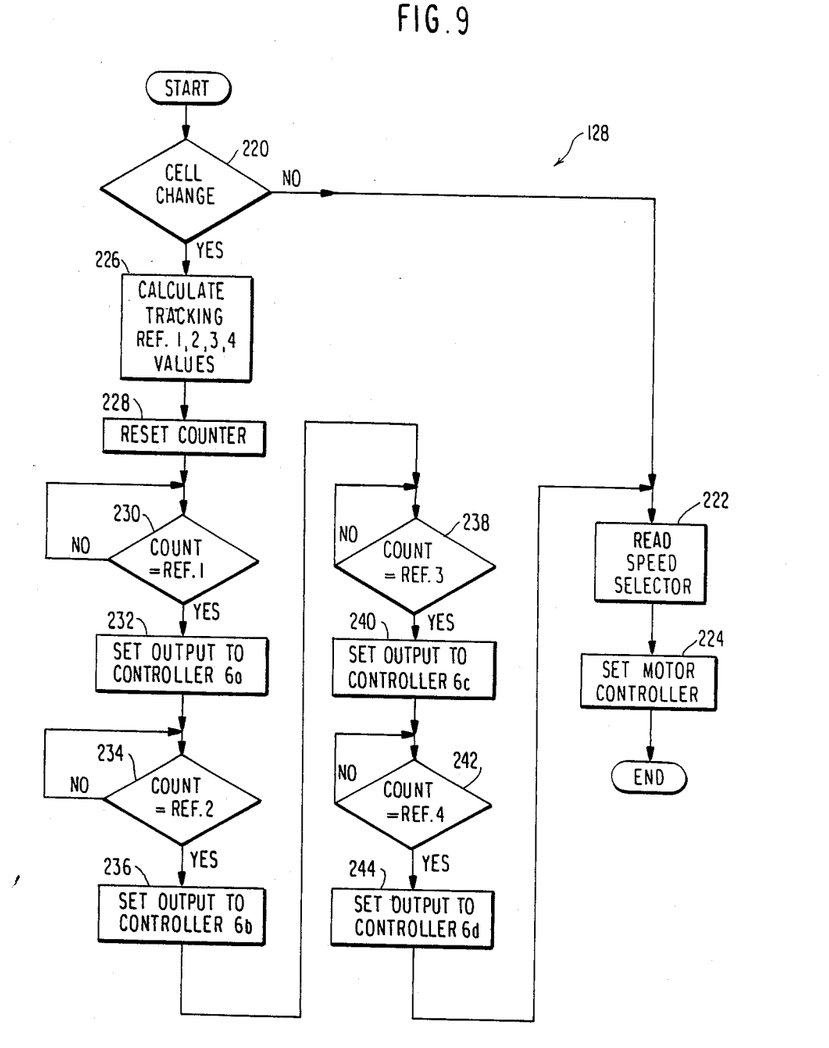
FIG. 9 is a detailed step diagram of another step in the procedure of FIG. 7.

The procedure 128 is shown in detail in FIG. 9. At the beginning of this procedure the need for a cell change is determined in step 220. If false, i.e., no cell is to be newly energized or deenergized, the program branches to step 222 where the line speed selector 210 is read, and then to steo 224 where the motor controller 212 is set in accordance with the reading made in step 222. From step 224 the program will return to step 106 in FIG. 7.

If step 220 is true the program proceeds to step 226 where tracking reference values for the controllers 6a, 6b, 6c and 6d are calculated. These values include counts of the counter 218 corresponding to advancement of a selected imaginary point on the strip from a selected position in front of or at the first active cell to selected positions at each respective cell, along with values to which the respective controllers are to be set. In the next step 228 the counter 218 is reset to 0. In step 230, the count of the counter 218 is compared with the first reference count in step 230 and continues to cycle through step 230 until true whereupon the program proceeds to step 232 where the output to controller 6a is set in accordance with the corresponding value calculated in step 26. Steps 234 and 236 similarly set the controller 6b when the count in counter 218 equals the second reference count, steps 238 and 240 set the controller 6c when the count in the counter 218 equals the third reference value, and steps 242 and 244 set the controller 6d when the count in the counter 218 corresponds to the reference 4 count. After step 244 the program proceeds to step 222.

In the calculation of the tracking reference 1, 2, 3 and 4 values in step 226, counts are determined so that changes in the current values in the plating cells 3a 3b, 3c and 3d will be made when a tracking point, i.e., an imaginary point, on the strip 1 reaches a particular point relative to each of the cells. For example, assuming count 1 corresponds to the tracking point on the strip 1 at the entrance of cell 3a, and the value applied by computer 18 to the controller 6a is changed from zero to $PI/(n+1)$ where n is the total number of energized cells prior to energization of cell 3a. Reference count 2 corresponds to this tracking point when it reaches the beginning or entrance of cell 3b and the corresponding value for controller 6b will likewise be changed to $PI/(n+1)$. Similarly, reference counts 3 and 4 correspond to the counts when the imaginary or tracking point of the strip 1 reaches the entrance to cells 3c and 3d and the values to be supplied to the controllers 6c and 6d are changed to $PI/(n+1)$.

If the number of energized plating cells is to be decreased from n+1 to n by deenergized plating cell 3a, then the value to be applied to controller 6a is 0 to effectively deenergize plating cell 3a at the reference count 1. The new values to be sent to controllers 6b, 6c and 6d will be $PI/n$ to increase the plating currents of cells 3b, 3c and 3d when the count of counter 218 equals reference counts 2, 3 and 4, respectively. Also reference counts 2, 3 and 4 can alternatively be set to correspond when the tracking point reaches the exit points of cells 3b, 3c and 3d instead of the entrance points.

By performing the change in current for each successive cell when the tracking point reaches the entrance of each cell, the deviation in thickness of plating occurring in advance of points 54 and 55, i.e., to the right of points 54 and 55 in FIGS. 3(e) and 3(f), is eliminated. There will still be some devriation in plating thickness occurring on the left of points 54 and 55 which is not eliminated. However, the elimination of the plating deviation to the right of points 54 and 55 greatly reduce the amount of unsuitably plated material.

When the increase of current is delayed until the tracking point reaches the exit points for cells following a cell being deenergized to decrease the number of active cells, the increase in plated thickness occurring to the section of step 1 to the left of point 55 in FIG. 3(f) is eliminated, and instead a short section of strip 1 to the right of point 55 will have a decreased plating thickness. This eliminates undesirable use of plating material on an unsuitably plated section of the strip 1.

It is noted that tracking of the imaginary point through the plating cells need only begin at the cell being changed and then proceed through any following cell; thus preceding cells which are deenergized and will remain deenergized after tracking is completed may have 0 or low reference counts to avoid the delay in tracking the imaginary point through these non-energized cells. Additionally, it is noted that, during the procedure 128 of FIG. 9, changes in line speed and changes in the value PI, i.e., steps 106, 108, 110, 112, 114 and 116 in FIG. 7 are inhibited since the program must complete the tracking through steps 230, 232, 234, 236, 238, 240, 242 and 244 prior to being able to adjust the value PI or change the line speed. Upon completion of the tracking steps the program proceeds to steps 222 and 224 where normal line speed changes are made, and then to steps 106, 108, 110, 112, 114 and 116 where normal adjustment of the value PI occurs.

Since many variations, modifications and changes in detail may be made to the above described embodiments, it is intended that all matter described above and shown in the drawings be interpreted as illustrative of the invention and not as limiting on the scope and spirit of the invention as defined in the following claims.

What is claimed is:

1. An apparatus for automatically controlling a plurality of plating cells in response to speed changes of an elongated material passing sequentially through the plating cells so as to maintain plating current density within a predetermined range while forming a desired plating thickness on the elongated material, the apparatus comprising
   means for measuring the speed of the elongated material passing through the plating cells,
   means connected to the speed measuring means for determining (1) a desired total plating current required to produce the desired plating thickness at the measured speed, and (2) a number of plating cells required to be energized to maintain the plating current density within the predetermined range at the measured speed,
   a plurality of current measuring means for measuring the plating currents to the respective plating cells,
   summing means connected to the plurality of current measuring means for obtaining the sum of the plating currents to the cells,
   means responsive to the determining means for energizing and deenergizing individual plating cells so as to maintain energization of the determined number of plating cells with the remaining number of cells being deenergized, means responsive to the determining and the summing means for controlling the plating currents of the energized plating cells so as to maintain the sum of the measured plating currents equal to the desired total plating current and to distribute the total required plating current among the energized plating cells to maintain the plating current density within the predetermined range while producing the desired plating thickness on the elongated material, tracking means, initiated in response to the energization or deenergization of a plating cell by the energizing and deenergizing means, for tracking the progress of a point on the material from a first energized plating cell to a last energized plating cell, compensating means for overriding the controlling means during the tracking of the tracking means and for providing changes in plating currents of energized plating cells in timed relationship corresponding to the tracking so as to reduce variation of plating thickness on a portion of the elongated material within the plating cells during the tracking; and lock means which locks operation of said controlling means during the period from start to completion of tracking.

2. An apparatus as claimed in claim 1 wherein said lock means is a lock switch provided at an input side of said control means.

* * * * *